United States Patent
Hundegger (12)

(10) Patent No.: US 6,196,283 B1
(45) Date of Patent: Mar. 6, 2001

(54) WOODWORKING MACHINE

(76) Inventor: Hans Hundegger, Kemptener Strasse 1, 87749 Hawangen (DE)

( * ) Notice: Subject to any disclaimer, the term of this patent is extended or adjusted under 35 U.S.C. 154(b) by 0 days.

(21) Appl. No.: 09/405,103

(22) Filed: Sep. 27, 1999

(30) Foreign Application Priority Data

Sep. 25, 1998 (DE) ............................................. 198 43 864
Feb. 22, 1999 (DE) ............................................. 199 07 585

(51) Int. Cl.[7] ................................ B27M 1/08; B27C 9/00
(52) U.S. Cl. ............................ 144/3.1; 144/39; 144/367; 144/369; 144/242.1; 144/245.1; 144/250.13; 409/215; 269/56
(58) Field of Search ............................... 144/1.1, 2.1, 3.1, 144/39, 41, 367, 369, 134.1, 242.1, 250.13, 245.1; 404/215, 216; 269/55, 56

(56) References Cited

FOREIGN PATENT DOCUMENTS 3420080   8/1995  (DE) .
0608746   8/1994  (EP) .

*Primary Examiner*—W. Donald Bray
(74) *Attorney, Agent, or Firm*—Jacobson, Price, Holman & Stern, PLLC

(57) ABSTRACT

A woodworking machine, in particular a trimming machine, of working elongate workpieces such as timbers, beams, boards and the like is proposed, the workpiece resting on a support and a longitudinally movable coupling element guiding the workpiece to working units. In this machine there is provided a guiding element which is likewise longitudinally movable and can be positioned in such a manner at a working unit that, on the one hand, optimal workpiece guidance is achieved and, on the other hand, the coupling element and the guiding element remain outside the operative region of the working unit.

44 Claims, 8 Drawing Sheets

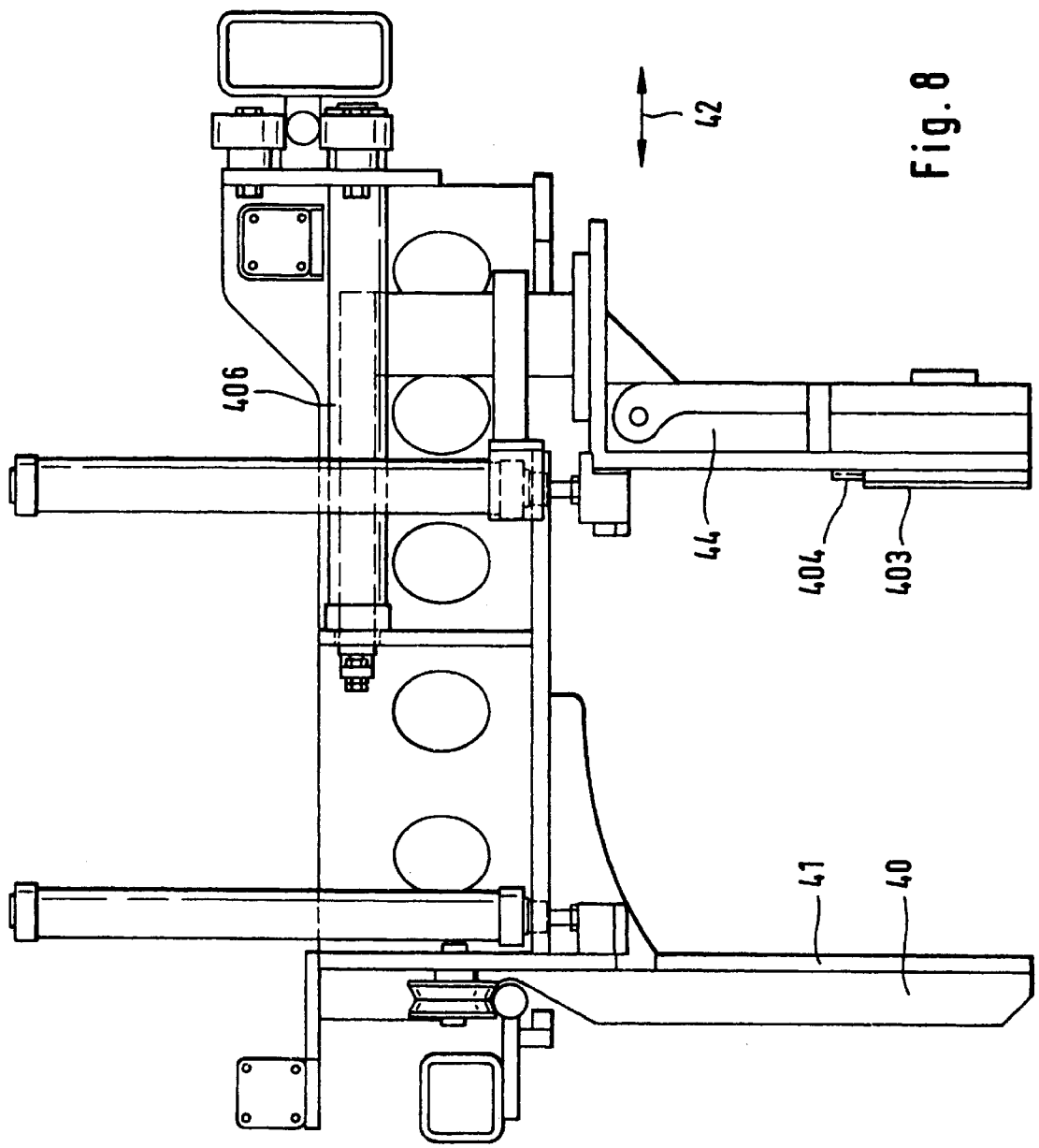

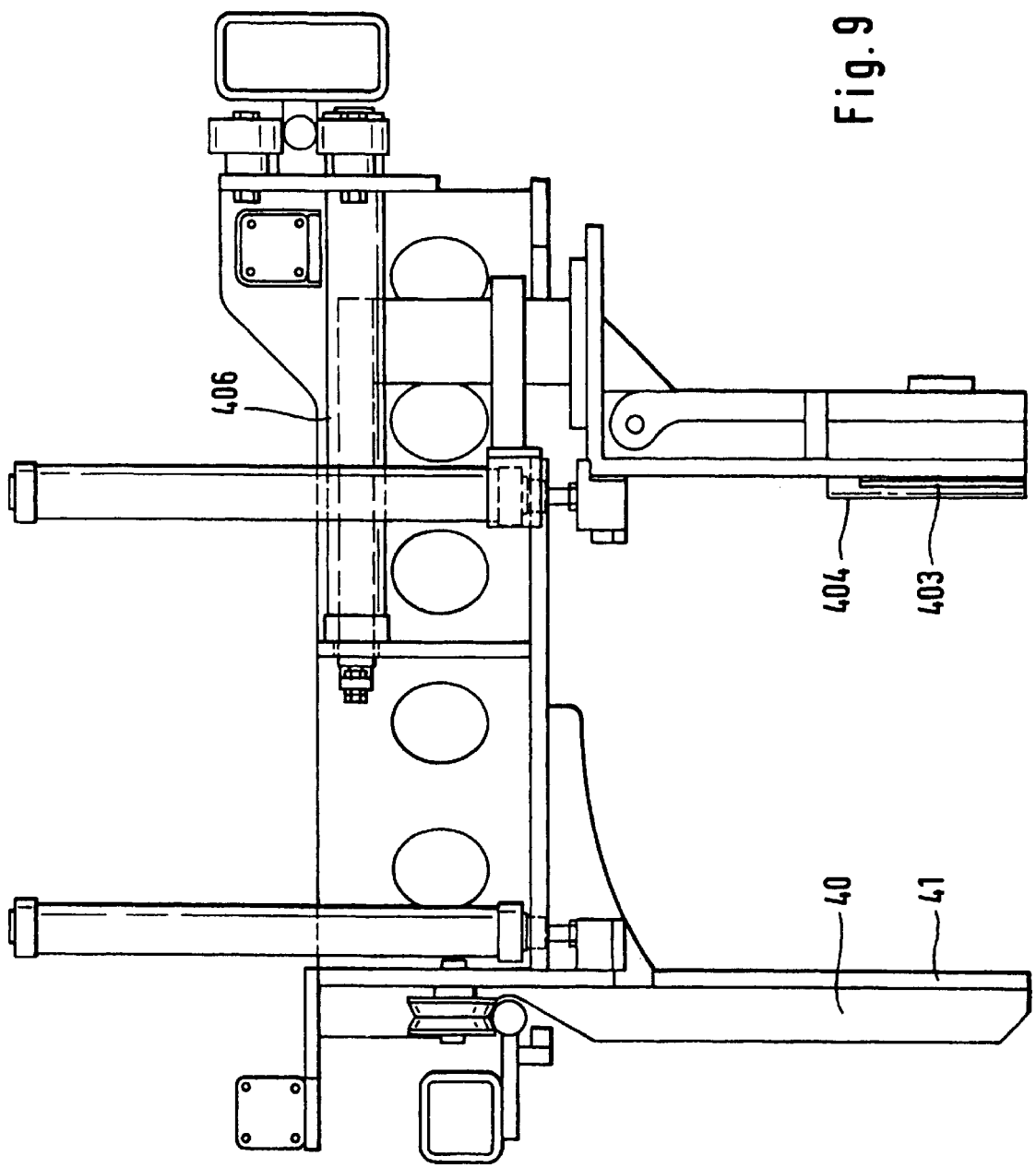

WOODWORKING MACHINE

FIELD OF THE INVENTION

The invention relates to a woodworking machine for working elongated workpieces such as timbers, beams, boards, round timbers or the like, the workpiece resting on a support and a longitudinally movable coupling element guiding the workpiece to one or more working units.

DESCRIPTION OF THE PRIOR ART

A woodworking machine, in particular a trimming machine, is known from German Patent Specification 34 20 080. The task of such a trimming machine is to prepare the timber pieces appropriately, as, for example, required for the construction of a roof truss, on the basis of a work plan designed, for example, by a CAD program. Such woodworking machines or trimming machines work fully automatically, which means that complex marking-out of the timber pieces is no longer necessary.

To convey the workpieces, it is known to effect, for example, frictional or positive connection, for example by a ram guided towards the workpiece from above. The workpiece rests, for example, on a table or roller track. The ram, serving as a coupling element, moves on a rail, with the result that the movement of the workpiece through the trimming machine is effected. The workpiece is guided by a longitudinally running fence.

The invention relates to a woodworking machine for working elongate workpieces as described above, a longitudinally movable coupling element guiding the workpiece to one or more working units. Such a woodworking machine is known, for example, from European Patent Application 608 746. Here, elongated workpieces are clamped on at least two clamping carriages which are movable on a guideway arranged below the workpiece and move the workpiece through a stationary portal-like working centre.

In the case of the above-described machines, there is the problem that the workpiece must be sufficiently guided in the region of the working machines, these are, for example, saws, borers, millers, planers or the like, to achieve reasonable working accuracy. For this purpose, it is known to guide or hold the workpiece in the region of the working unit by stationary stops. The working units here are generally multi-axis machines which may have a considerable working radius, and the stops must of course be arranged outside this working radius to ensure 100% that the stops are not reached by the working tools and damaged or the working tools are not damaged by the stops, which are produced from metal. Stationary clamping means are situated in the region of the working tools to guide the relatively long workpieces with a certain degree of accuracy in the region of the working units. However, the stationary clamping means must likewise remain outside the working radius of the working units to avoid damage.

The result of this is a relatively large distance between the point of guidance of the workpiece and the actual working, and this may lead to dimensional tolerances, particularly in the case of curved workpieces, with the risk that rejects might arise. It should also be noted that the workpiece, which projects beyond the fixing point, tends to vibrate during working and therefore accurate working may not be ensured.

BRIEF SUMMARY OF THE INVENTION

The object of the invention therefore is to improve a woodworking machine as described above such that it provides greater accuracy, even in the case of curved workpieces, and in particular reduces rejects.

This object is achieved firstly by a woodworking machine as described above in which a clamping carriage equipped with at least one movable clamping jaw serves as a coupling element and the coupling element clamps the workpiece with its clamping jaws. In the case of this arrangement of the invention, the timber workpiece rests on a table or roller track. The coupling element grips the workpiece from two sides, one clamping jaw, for example the non-movable clamping jaw, serving as the zero line and thus replacing the stop. The width dimension is thereby precisely fixed and it is possible to dispense with the complex longitudinally running fence. At the same time, it is possible to position the coupling element so close to the workpiece that optimal guidance or firm clamping of the workpiece in the region of the working unit is possible, without the risk of the coupling element being in the region of the working unit.

The solution according to the invention furthermore achieves the effect that the timber to be transported is gently gripped. In the case of the known embodiments, a point or a cutting edge is pressed into the timber, which may lead to visible marks. With regard to this proposal, the timber is treated gently and no visible impressions are produced.

The proposal according to the invention permits the positioning of workpieces with a coupling element as described. It is thereby also possible to position relatively short workpieces with the same accuracy as relatively long workpieces. With such an arrangement, it is possible to work workpieces up to 6 meters or greater in length, but it is also possible at the same time to work workpieces of less than 80 centimeters. The result of this is a woodworking machine of enormous variability.

The measure according to the invention has created a high-quality and highly versatile woodworking machine. The woodworking machine is not only capable of being used as a trimming machine as described at the beginning, i.e. of performing essentially carpenter's work, but is also to be seen at the same time as a woodworking centre on which complex working operations can be performed. For example, it is possible to use the above-described woodworking machines to produce elements for stair manufacture, balustrade manufacture, wooden boxes, but also, for example, toys etc. The woodworking machine according to the invention is therefore capable of performing both carpentry-type working operations and joinery-type working operations. There results a very high degree of flexibility of this woodworking machine, which promotes in particular cost-effective operation of the machine.

In a variant of the invention there is provision for there to be provided, in addition to the coupling element, a guiding element which is likewise longitudinally movable and can be positioned in such a manner at a working unit that, on the one hand, optimal workpiece guidance is achieved and, on the other hand, the coupling element and the guiding element remain outside the operative region of the working unit. The guiding element is provided as a second element besides the coupling element. If required, the workpiece is moved by the two elements simultaneously, the guiding element functioning as a coupling element in this case. By using these two elements, however, it is also possible to perform a relative movement of the workpiece with respect to the guiding element, with the result that the guiding element is positioned as close as desired to the working unit and thus enables optimal guidance of the workpiece. In this embodiment, the guiding element may be of the same design as the coupling element, i.e. in the form of a clamping carriage, with at least one movable clamping jaw, the cooperation of the two clamping jaws defining in particular the zero line (Y direction).

Furthermore, this object is achieved by a woodworking machine as described above in which there is provided a guiding element which is likewise longitudinally movable and can be positioned in such a manner at a working unit that, on the one hand, optimal workpiece guidance is achieved and, on the other hand, the coupling element and the guiding element remain outside the operative region of the working unit.

The arrangement according to the invention achieves the effect that the guiding element is always positioned optimally relative to the working unit and the working operation performed on the working unit, for it is to be ensured that the working unit does not require the maximum working space for each working operation. However, the control system, which after all controls the working unit in accordance with the steps to be carried out, may at the same time determine the position of the guiding element in dependence on the working position of the tool and thus achieve optimal adaptation. It is even possible to realize dynamic adaptation, that is to say the guiding element is first positioned in a potential danger area, but if the working tool then comes into this area the guiding element is retracted beforehand.

DETAILED DESCRIPTION OF THE INVENTION

The movements of the two elements, the guiding element and the coupling element, are coordinated with one another, such that, for example, the guiding element, which is situated for example ahead of the coupling element in the conveying direction, is advanced as close as possible to the working unit and then the workpiece is moved relative to this guiding element, the coupling element taking on the conveyance. In this case, the guiding element does not clamp the workpiece firmly, but enables sliding guidance, the guiding element acting, for example, as a mouthpiece and providing reliable positioning and a secure contact surface. The advantage here is that this stop exists at any desired location on the woodworking machine, without providing for complex setting work for this purpose as with the mounting of the fence, and at the same time it is possible to reposition the stop, which is situated in the guiding element, as needed and thus optimally adapt it to the circumstances.

In a variant of the invention there is provision for the workpiece to rest on a support. The workpiece is situated here on a table or roller track in a similar way to that in the known prior art. In order to enable as smooth-running a transportation as possible, the rollers are mounted in a smooth-running manner or the support table is furnished with a sliding surface made of plastic, Teflon, polyamide, PVC or the like. It is, however, also possible for the solution according to the invention also to be realized if the workpiece rests in the coupling and guiding element. In such a case, the guideway of the coupling and guiding element will be situated, for example, below these elements and will transport the workpiece in the manner of a slide, supported from below. In such an embodiment too, it is possible to design, for example, the rear element as the coupling element and thus as the element fixedly coupled to the workpiece, whereas the front guiding element merely takes on the task of a guide or stop and support for the workpiece during the working.

In a variant of the invention there is provision for the coupling element to be a cutting edge, point, ram, rubber plate, toothed plate, spiked or piercing plate, which can be placed against the workpiece and establishes a frictional or positive connection of the workpiece. Accordingly, elements of various designs are provided as the coupling and guiding elements, a guiding, sliding function being paramount in the case of the guiding element, but a force-transmitting, transporting function being paramount in the case of the coupling element. Various means, which according to the invention can be combined, are known here as the coupling element. For example, this embodiment is also of interest as a retrofit kit for existing machines, in particular trimming machines. The coupling element acts against the workpiece vertically or obliquely from above. It is also possible for the coupling element to be set laterally against the workpiece.

According to the invention, a solution is also employed in which the coupling element and the guiding element are of substantially identical construction and are constructed as a clamping carriage equipped with at least one movable clamping jaw. In this case, the coupling element has means for clamping the workpiece against the clamping jaw.

The guiding element has, for example, a clamping carriage which is arranged to be longitudinally displaceable and possesses at least one movable clamping jaw. The guiding element grips the workpiece laterally or from above and guides the workpiece in the manner of a stop.

Furthermore, it is proposed that a drive for relative movement of the clamping carriage with respect to the workpiece is provided on the clamping carriage. In the case of such an embodiment, it is possible to guide and convey the workpiece simultaneously, that is to say to form a stop and simultaneously convey the workpiece towards the working tool. The drive provided for the relative movement of the workpiece is, for example, an endlessly circulating belt or chain on one or both of the clamping jaws. In order to improve the coupling between the relative drive and the workpiece there are provided, for example, points or small cutting edges on the roller elements or the circulating belts or chains.

In a further embodiment of the invention there is provision for one or more working tools to be provided on the clamping carriage. Besides the working units, working tools are thus also provided on the clamping carriage, opening up an additional working possibility. It is possible, for example, to arrange a borer or miller on the clamping carriage to be movable along five axes and thus achieve further variability in the processing of the workpieces.

There is also provision for a turning or pivoting device for the workpiece to be provided on the clamping carriage. The workpiece often has to be worked not only on its bearing side, but on a plurality of bearing sides, with the result that it becomes necessary to turn the workpiece rotationally about its longitudinal axis. This procedure is accomplished by an appropriate turning device arranged on the clamping carriage. At the same time, it is possible to arrange a pivoting device on the clamping carriage, in which pivoting device any desired angular amounts can be set and which, where appropriate, also serves as a turning device. The invention thereby also enables complex working, for example on the circumferential surface of the workpiece, when, for example, the workpiece is worked by a working unit during pivoting or in a pivoted position. The resulting variability of the working possibilities is enormous. In order to realize the turning alone, it is also proposed according to the invention to provide a turning device on the woodworking machine.

This turning device turns the workpiece about its longitudinal axis while the clamping or coupling element releases the workpiece. A centering or stop pusher then brings the turned workpiece back into the engagement region of the coupling and guiding element, which then grip and transport the workpiece again.

It is proposed to employ the guiding element optionally also as a coupling element for transporting the workpiece through the woodworking machine. Such an embodiment makes the conveying element even more effective and efficient, since either secure guidance even of long workpieces is achieved by two coupling/guiding elements or else two separately operating guiding/coupling elements convey or move two different workpieces. An appropriate NC or CNC control system can control these elements individually. Also, in a preferred embodiment of the invention, the combination with a third guiding element, which optionally serves as a guiding or coupling element, in cooperation with two further guiding/coupling elements, produces great flexibility of the machine, since the working sequences can be optimized as desired. Through an appropriate larger number of coupling and guiding elements, it is possible to move, guide and work a plurality of workpieces simultaneously in the woodworking machine.

In a development according to the invention there is provision for a working tool to be, at least temporarily, fixedly assigned a guiding element and two or more workpieces to be worked simultaneously and for each workpiece at least one coupling element to be provided. The guiding element is, at least temporarily, fixedly assigned, for example, to the circular saw, that is to say it serves as a guiding element for this circular saw and performs there the optimal workpiece-guiding tasks described at the beginning. It is not fixedly arranged, that is immovable, but is able to yield of course in the event of danger of collision. If now, for example, a beam is to be worked at both ends, this may be effected, in the case of the development according to the invention presented here, by the guiding element firstly guiding the front end, the first coupling element thereafter conveying the workpiece through the circular saw or the working unit and a second coupling element gripping the workpiece at the rear side and then the same guiding element, now however positioned relatively on the other side of the working tool, taking on the guiding task at the rear-side end. The freed coupling element in this case serves to advance a new workpiece. This gives rise to the possibility of combining the working steps as desired and in particular produces greater efficiency, since a plurality of workpieces may be worked simultaneously in the machine.

In a further embodiment of the invention there is provision for the clamping jaw to have a sliding plate, in particular made of plastic, on the inner side turned towards the workpiece. Such an embodiment prevents excessive frictional forces occurring, particularly when the clamping jaw is provided on a guiding element, when guiding the workpiece towards the working unit, the guiding element in this case being, for example, stationary. A similar effect may also be achieved, for example, by rotatable and brakable bodies mounted in the clamping jaw. These bodies likewise produce smooth running of the workpiece and are brakable when the guiding element is to be converted, for example, into a coupling element. The functionality of the body can there be set between a sliding body (for example in the case of the guiding element) and a clamping body (for example in the case of a coupling element) by the choice of the smooth-running nature of the body. In order to intensify the corresponding effect, there is provision for a spherical, rotating body also to be equipped with points, needles, a rubber coating or the like at its circumference in order to increase, where appropriate, the friction or the frictional and positive connection.

By using the bodies which may be designed, for example, as spheres, cylinders, truncated cones or double truncated cones, the clamping jaw is, for example, also adaptable to different cross-sections of workpieces. The use of truncated cones or double truncated cones or the use of a spherical body in particular allows, for example, round timbers to be worked.

Besides using a sliding plate, however, it is also possible for a movable or stationary sliding body to be provided on at least one clamping jaw on the inner side turned towards the workpiece. In this context, a sliding body is also taken to mean, for example, a sliding plate or a smooth-running roller. The sliding plate is employed particularly in cases where the clamping carriage is to have the functionality of a guiding element. A stationary sliding body may be designed, for example, in one piece with the clamping jaw, i.e. be fixedly connected to it, for example adhesively bonded or welded. It is also possible to produce the clamping jaw of one piece with the sliding body, for example of plastic. A movable sliding body is employed, for example, in cases where this sliding body can be placed against and retracted from the workpiece or other elements relative to another face of the clamping jaw. It is thereby possible in a simple way, as will be described, to equip a clamping carriage with both functionalities of a coupling element and guiding element.

In a preferred embodiment of the invention there is provision for at least one clamping jaw to have a movable or stationary clamping body, in particular a clamping ram, a spiked, piercing, grooved, toothed, needle, cutting or rubber plate, which enables a frictional and/or positive connection with the workpiece. It is possible to design the clamping body in one piece with the clamping jaw, in a similar manner to the embodiment of the sliding body. It is, however, also possible to design the clamping body in accordance with the invention to be exchangeable on the clamping jaw. In the case of a movable clamping body, there is the option of moving the clamping body forwards or back in relation to the workpiece, for example, relative to a sliding body, in order to bring either the clamping body or the sliding body into contact or engagement with the workpiece and thus switch between the functionality of a guiding element and coupling element at the clamping carriage equipped with such a clamping jaw. The movement may be effected by appropriate pneumatic, hydraulic or working cylinders or by electrical actuating drives.

In a further embodiment of the invention there is provision for the clamping jaws to be connected frictionally and/or positively with the workpiece. A frictional connection is achieved, for example, by clamping the clamping jaws against the workpiece. A positive connection may be achieved, for example, by using points or cutting edges on the clamping faces.

It should be ensured in this case that a frictional connection, for example a rubber plate, a plate or a clamping ram with a material having a high coefficient of friction, does not damage the workpiece to be worked.

For the embodiment of the clamping carriages there is provision for at least one clamping jaw to be movable by a force means, in particular a pneumatic cylinder, towards the workpiece, to firmly clamp it or to form a stop. Besides the use of a pneumatic cylinder as the force means, it is of course also possible to use an electrical servomotor or a hydraulic cylinder or similar means (for example an electrical drive) as the force means.

It is favourable here if the stationary clamping jaw, as a movable stop, defines a zero line. The stationary clamping jaw defines, with regard to its longitudinal movement along the rail, a movable stop which defines a zero line in the Y direction (conveying direction corresponds to the X direction). As an alternative to this proposal, however, it is possible to design both clamping jaws to be movable and to be capable of being placed against the workpiece, with the result that, for example, centering is possible. The determination of the zero line is somewhat complex here, since the position of the clamping jaws in relation to one another has to be scanned, for which an additional sensor has to be employed. There is provision here for the clamping jaws to grip the object, for example, in a centered manner, thus for the two clamping jaws to be driven uniformly, for example coupled to one another via an appropriate linkage or gearing. Such an embodiment makes it possible to effect the clamping movement with only one working cylinder or force means as well.

Such an embodiment achieves the effect that the center plane between the two clamping jaws defines a zero line and the arrangement of the coordinates relative to the zero line may, for example, have positive and negative values. This facilitates in particular the centering in the case of substantially symmetrical working.

In a variant of the invention there is provision for the force which is impressed on the workpiece by the clamping jaw to be greater during the gripping and transporting of the workpiece than the force which is impressed when the guiding element guides the workpiece in the region of a working unit. Such an embodiment makes it possible to choose, using one element, both a coupling element and a guiding element on the basis of the force generated by the force means. In the case where the guiding element guides the workpiece, the inner faces of the clamping jaws serve merely as stops and impress only a small force, if any, on the workpiece. This is necessary for a reasonable relative movement to be possible between the guiding element and the workpiece. This is assisted by an appropriate embodiment of the clamping carriage or the clamping jaw, in which the above-described two functionalities, the functionality of the coupling element and the functionality of the guiding element, is provided by an appropriate arrangement and mobility of clamping and sliding bodies.

In a further embodiment of the invention there is provision for a hold-down element for the workpiece to be provided on the clamping carriage, i.e. both the coupling element and the guiding element. The hold-down element, which is arranged in a longitudinally displaceable, centered manner, for example, on the clamping jaws or between the clamping jaws and can be placed against the workpiece vertically, achieves the effect that the workpiece is always advanced as uniformly as possible to the working unit. The hold-down element is important particularly in cases where bent or crooked workpieces are to be worked which protrude upwards, for example, in the region in which the hold-down element is to be employed and thus would produce dimensional inaccuracy. Besides the use of hold-down rollers, it is also possible for there to be provided a hold-down plate which can be placed against the workpiece from above and thus presses the workpiece downwards. In a preferred embodiment of the invention, there is also provision for a guiding mouth for the workpiece to be provided on the coupling element and the guiding element. The guiding mouth is adaptable here in its cross-sectional area to the cross-sectional area of the workpiece. Two sides of this guiding mouth are formed here by the clamping jaw, the guiding mouth is of substantially flat design here and presses on the workpiece on the remaining third side. In this case, the support surface also belongs, as the fourth face, to the mouth and forms a mouth- or boxlike guide for the workpiece. In order to create a smooth-running arrangement, the use of hold-down rollers in particular is favourable, since the rollers roll easily on the workpiece and thus do not hinder the forward movement of the coupling element. As an alternative to this, it is also possible to provide an appropriate sliding coating, for example a TEFLON non-stick coating or plastic coat, on the hold-down means.

By using combined guiding/coupling elements, it is also readily possible markedly to increase the cross-sectional width or the cross-sectional area of the workpieces to be worked, since these dimensions depend substantially only on the embodiment of the guiding element.

For the embodiment of the guideway, which receives the guiding element and the coupling element, there is provision for this guideway to be designed, for example, as a rail having guiding roller tracks on one or two sides. In a variant of the invention, it is also possible for the coupling element and guiding element to reach in the manner of a portal over or under the workpiece and a double guideway with a certain mutual spacing to be provided for the guidance of the elements. Greater stability is achieved through such an embodiment.

In a preferred embodiment of the invention there is provision for one or more guideways for as independent a movement of a plurality of clamping carriages as possible to be provided on the woodworking machine. Great flexibility is achieved through such an embodiment, since various strategies may be provided for transporting the workpieces. On the one hand, it is possible for a coupling- and guiding-element unit to accompany a workpiece through the entire machine, but it is also possible for the transfer to take place at a certain point in time and then for the clamping carriages to be moved to their new positions separately from one another. In this case, it is possible for some or all of the guideways to be arranged above, beside or below the support surface.

Great variability of the machine is achieved through such an embodiment.

Furthermore, the invention proposes that the control system of the woodworking machine specifies various strategies for transporting and guiding the workpiece in dependence on the working step. For example, there is provision for the workpiece to be gripped and conveyed by two coupling elements. Here, the "guiding element" has been reassigned as a coupling element, which is achieved, for example, by appropriate control of the force means for clamping the workpiece or by deploying the clamping body by an appropriate relative movement of the clamping body with respect to the workpiece in order to bring the clamping body into engagement with the workpiece. It is also possible to employ both aforementioned means (control of the force means and deployment of the clamping body) simultaneously. Reliable transporting even of long workpieces is achieved through such an embodiment.

Once the workpiece is transported up to a working unit, there is provision for the workpiece to be gripped and conveyed by one coupling element, while the guiding element guides the workpiece or serves as a stop. In this case, the second coupling element is assigned back to being the guiding element again, the clamping action at this coupling element, for example, being "reduced".

In the same way, it is also possible to deploy the sliding body instead of the clamping body. This is possible, for example, by a reverse relative movement as described above.

When the working operation is finished, only one coupling element, for example, is then employed to transport the workpiece away, the other guiding element again serves as a coupling element and advances the next workpiece.

In order to increase the variability and in particular the processing speed, there is also provision for the moving workpiece to be transferred from a first coupling element to a second coupling element. The difference between a guiding element and a coupling element ultimately lies in the force which is impressed into the clamping jaws by the holding means and/or whether a clamping or sliding body is deployed on the workpiece. If the woodworking machine uses both a guiding element and a coupling element, both elements may be employed, for example, simultaneously as a first and second coupling element. By transferring the workpiece while in motion, an enormous increase in speed is achieved, since the workpiece does not need to be braked first, the transfer initiated and the workpiece then accelerated again.

The control system of the woodworking machine is designed here so that the position of the guiding element at the workpiece and the holding force at the clamping jaw on the respective guiding element is set and checked in dependence on the working unit. For precise position determination, sensors are used. The control system, which specifies the appropriate working steps and takes them from a design plan, has routines which produce an optimized arrangement of the guiding and coupling positions on the workpiece. On the basis of the specified data, the control system also detects whether the clamping carriage is to be employed as a guiding element or as a coupling element and sets an appropriate holding force and/or the deployment of clamping/sliding bodies at the clamping jaws.

In this connection, it is advantageous if the woodworking machine has a control system, in particular NC or CNC control system, and each coupling element and guiding element is individually controllable. The control system is assisted here, for example, by a microprocessor and puts together the respective working steps and coordinates on the basis of the design data or the work planning. In order to achieve a high level of variability of the two clamping carriages, which may optionally be employed as a coupling or guiding element, these two elements are, according to the invention, controllable independently of one another. It is also possible for more than two clamping carriages to be employed. There is provision, on the guideway or the clamping carriage, for means and sensors which allow precise positioning of the clamping carriage, coupled with precise identification of the clamping carriage, on the machine. It is thereby possible precisely to determine and fix the position of the clamping carriage in the system, but also the relative position of the clamping carriage as a coupling or guiding element while transporting the workpiece. This is particularly important to achieve optimization of the cutting-up while minimizing waste.

In a further embodiment according to the invention there is provision for two or more guideways for the clamping carriages to be provided parallel to one another and for one or more clamping carriages to be capable of being employed on one guideway. Such an embodiment makes it possible to employ, for example in two guideways independent of one another, altogether, for example two times two, four clamping carriages, optionally as a coupling element or guiding element and to transport through the woodworking machine and work at least two workpieces simultaneously while in continuous motion. The flexibility and also working speed are markedly increased through such an embodiment.

In a development according to the invention there is provision for the coupling element to grip and convey the workpiece at a short distance behind the guiding element and, where appropriate, for the coupling element to re-grasp the workpiece in order to convey it on. It has been found that, particularly in the case of greatly twisted or bent timbers or workpieces, it is not favourable if the distance between coupling element and guiding element (which is situated in very close proximity to the working unit) is too great, since the radius of curvature then leads to undesired dimensional tolerances. It turns out that the point of contact "travels", that is the part of the workpiece being worked is not moved parallel to the conveying direction. The working is not straight. In such a case there is provision for the coupling element to be arranged as close as possible behind the guiding element on the workpiece and thus form the second point of contact or guidance and conveyance. This short distance means that any distortion is not serious or damaging to the working, straight guidance of the workpiece during the working being possible in spite of this. The distance which is to be chosen between coupling element and guiding element in the case of this embodiment depends on the one hand, for example, on the extent to which the workpiece is to be conveyed during the working. It is thereby possible for re-grasping of the workpiece by the coupling element to be avoidable. On the other hand, this distance is dimensioned according to the radius of curvature and the tolerable dimensional tolerances which may still arise because of such dimensional inaccuracies. This dimension may range from a few clamping-jaw lengths to one-third or half of the workpiece and is dependent on each individual case. The precise dimension is possible, for example, through appropriate measurement of the beam in the entry region prior to the actual woodworking. Such an embodiment ensures that even coarse, twisted timbers are worked with great accuracy.

In a variant of the invention there is also provision for only one coupling element, for example equipped as a clamping carriage, to transport and appropriately position a workpiece of small length (1 m and less).

Furthermore, it is proposed, according to the invention, that a vertical, horizontal or angular clamping direction of the clamping jaw be provided. In the woodworking machine according to the invention, shown in the exemplary embodiments of the drawing, a horizontal clamping direction of the clamping jaws is shown. It is, however, equally possible to orient the clamping direction of the clamping jaws vertically, in which case, for example, the workpiece is mounted in the clamping jaw. It is also possible to design the clamping direction to be at any angle, for example to carry out more complex working operations on the circumferential surface of the workpiece. This is favourable particularly in cases where, for example, a pivoting or turning device is combined on the clamping carriages.

BRIEF DESCRIPTION OF THE DRAWINGS

FIGS. 8, 9 show in side view, in two different positions respectively, a clamping jaw according to FIG. 7.

DETAILED DESCRIPTION OF PREFERRED EMBODIMENTS

Figure 1:
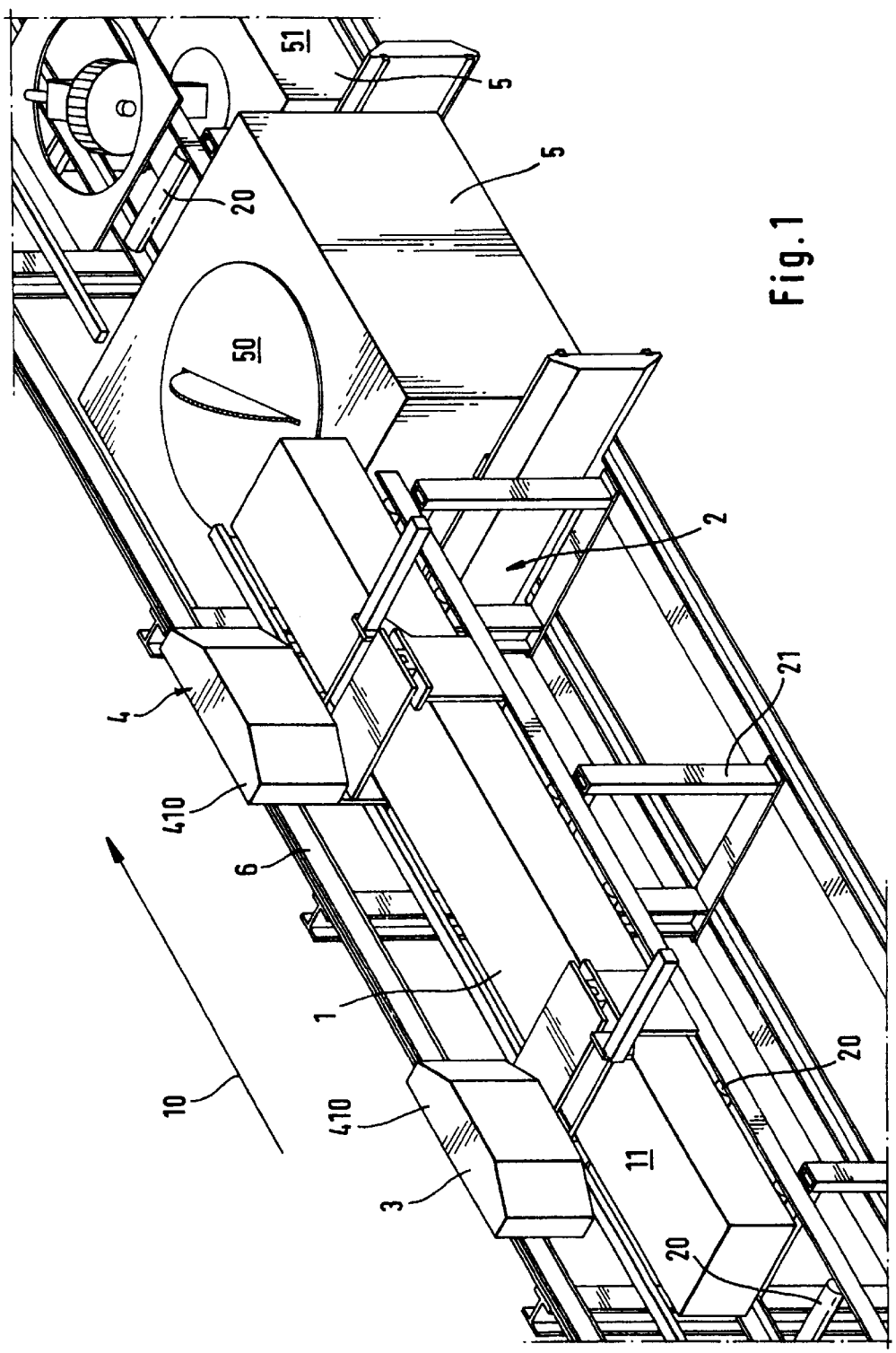
FIG. 1 shows a three-dimensional view of a woodworking machine according to the invention, FIGS. 2, 3 each show a vertical section through the woodworking machine according to the invention, FIGS. 4, 5 each show, in elevation, details of the woodworking machine according to the invention.

In FIG. 1 there is depicted a woodworking machine according to the invention, in this case in particular a trimming machine. The task of a woodworking machine is to perform various working operations on the workpiece 1 in accordance with the specifications of a design plan. The above-described woodworking machines are employed, for example, for trimming the wooden beams for constructing roof trusses. The range of application of such woodworking machines is very extensive. It is possible, in general, to work structural timber, the measurement, the positioning and the various working steps being performed fully automatically.

A plurality of working units 5 are provided for working the workpiece 1. The numeral 50 denotes a saw which is mounted to be movable about at least three axes and is capable of performing various cuts, even at different angles.

In the conveying direction 10, downstream of the saw 50, there is provided a milling station 51. The milling device is mounted to be movable about five axes and is capable of performing various milling operations. An end-milling cutter is also provided for this purpose.

The workpiece 1 is conveyed through the woodworking machine along a rail 6. During this, the workpiece 1 rests on the support 2, which is designed as a roller track 20. The rollers 20 are supported on a frame 21.

Figure 2:
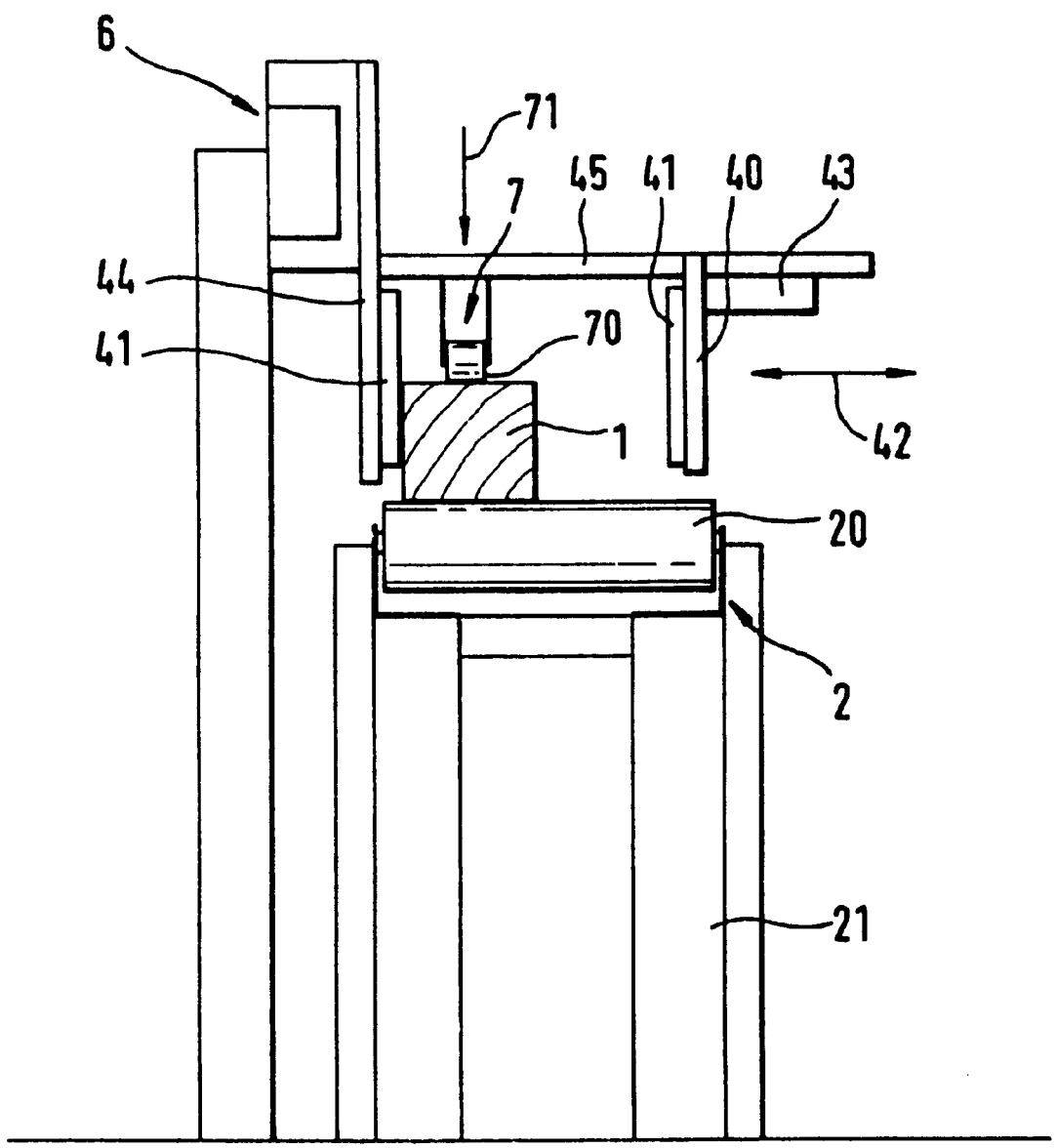

In the exemplary embodiment of the invention shown in FIG. 1 and FIG. 2, the rail 6 is arranged above the roller track 20. The coupling elements 3 and guiding elements 4 are movably mounted on the rail 6. These elements are designed, for example, as clamping carriages 410. The coupling element 3 and the guiding element 4, which can also perform the function of a clamping carriage 410, serve to move the workpiece 1 along the rail 6 in the main conveying direction 10. The woodworking machine is of course also equipped here so that bidirectional movement of the workpiece 1 on the roller track 20 is possible, that is movement counter to the main conveying direction 10. This is advantageous, for example, when repositioning for the purpose of reworking.

The inventive concept is, however, not limited merely to the embodiment shown here, but may equally be employed in cases where the rail 6 is arranged below the workpiece 1 and the coupling and guiding element 3, 4 reach under the workpiece 1 or carry it in a holding manner.

The coupling and guiding element 3, 4 are of substantially identical construction. The construction is described with the aid of FIG. 2. The coupling element 3 and the guiding element 4 comprise two clamping jaws 40, 44, one clamping jaw being designed to be substantially stationary. This stationary clamping jaw 44 is in this case the clamping jaw which is arranged, relative to the workpiece 1, on the side with the rail 6. The workpiece 1 is situated between the two clamping jaws 40, 44. To grip and firmly hold the workpiece 1, the clamping jaw 40 is arranged to be longitudinally movable on the carrier 45. The carrier 45 projects over the workpiece 1. In an analogous embodiment, the carrier 45 may, however, also reach under the workpiece 1.

The carrier 45, which is substantially horizontally oriented, may be arranged to be vertically displaceable. This is advantageous particularly in cases where long timber pieces are to be gripped. On the carrier 45 there is provided a hold-down element 7. The hold-down element 7 has the effect that the workpiece 1 rests securely on the support 2. In cooperation with the two clamping jaws 40, 44, the workpiece 1 is thus fixed on four sides or on all sides or is clamped, in particular in the region of the working units 5. The hold-down element 7 is designed here, for example, as a roller 70 which can be guided towards the workpiece 1 by an independent vertical drive (represented by the arrow 71). This embodiment makes it possible to work even workpieces of varying heights. The hold-down element 7 is pressed against the workpiece 1, for example by a pneumatic cylinder or a spring force or a sufficient force due to weight. The hold-down element 7 is longitudinally displaceable on the carrier 45 and is favourably arranged centrally above the workpiece 1. It is also possible to arrange a plurality of hold-down elements 7 on the carrier 45.

The movement of the movable clamping jaw 40 is indicated by the double arrow 42. For the drive of the movable clamping jaw 40 there is provided a force means, in particular a working cylinder 43, which can be acted upon, for example, pneumatically and thus permits movement of the movable clamping jaw 40. In the case of a double-acting design of the working cylinder 43, it is also possible to effect the retracting movement in order to release the workpiece 1.

The movement of the clamping jaw 40 may be disposed here substantially at right angles to the main conveying direction 10.

According to the invention, it is proposed that the clamping jaws 40, 44 grip the workpiece 1 either frictionally or even positively. In the case of positive gripping there are provided on the inner sides of the clamping jaws spikes or other elements which press into the surface of the wood and thus produce a positive connection. In the case of a frictional connection, it is possible for the workpiece 1 to be displaceable relative to the clamping jaws 40, 44 and relative to the guiding element or coupling element 3, 4 by an appropriate feed force. In order to assist this effect further, there may be provision for a sliding plate 41 made of plastic or the like to be provided on each of the inner sides of the clamping jaws turned towards the workpiece 1. This is advantageous particularly in cases where the guiding element 4 effects guidance of the workpiece 1, while the coupling element 3 conveys the workpiece 1 towards the working unit 50.

As illustrated in FIG. 1, it is possible to position the guiding element, which in the conveying direction 10 is arranged at the front end of the workpiece 1, in such a manner at or in the working unit 5 that optimal guidance of the workpiece 1 is achieved. Favourable working results are achieved when the distance between the point at which the workpiece 1 is guided or held and the working point of the working unit 50 is as small as possible. Conversely, this is determined by the operating region of the particular working unit 5. Since this information is available to the control system, however, and the control system ultimately determines the tool and the working step, the control system is capable without any problems of optimally positioning the front guiding element 48, in view of the working region to be expected. It is of course also possible to correct the positioning of the guiding element 4 during the working, in order to achieve optimal guidance at all times step-by-step.

There is provision here for the guiding element 4 either to hold the workpiece 1 in a clamping manner or only to hold or guide it, a relative movement of the workpiece 1 with respect to the guiding element 4 being possible.

FIG. 1 shows that the coupling element 3 and the guiding element 4 are constructed substantially mirror-symmetrically in relation to one another. The configuration is chosen in such a manner that as few machine parts of the guiding element 4 project into the region of the working unit 5 as possible and nevertheless optimal guidance of the workpiece 1 is achieved. In the exemplary embodiment illustrated in FIG. 1, the coupling element 3, located at the rear in the main conveying direction 10, would be capable of being positioned, in relation to the working units 5, in the same way as the front guiding element 4 in the conveying region when working the rear side 11 of the workpiece 1. There is also provision here for the functionality of the coupling element 3 and guiding element 4 to be appropriately reversed in the case of rear-side working operations.

The coupling element 3 and the guiding element 4 are situated on a rail 6. The coupling element 3 and guiding element 4 may be functionally interchangeable or functionally equal in action. The coupling and guiding element 3, 4 are purposely, separately driven and each has an independent positioning unit. The drive may be formed, for example, by an independent spindle drive or else an independent motor with pinion, which also engages a rack. Of course, an appropriate chain or V-belt drive is also possible. It is, however, also possible to arrange a plurality of coupling/guiding elements 3, 4 on the rail 6, which enable flexible working of the workpieces 1. The coupling and guiding elements 3, 4 are in this case separately controlled by the control system and, according to the planned working steps, independently or dependently controlled and checked.

Figure 3:
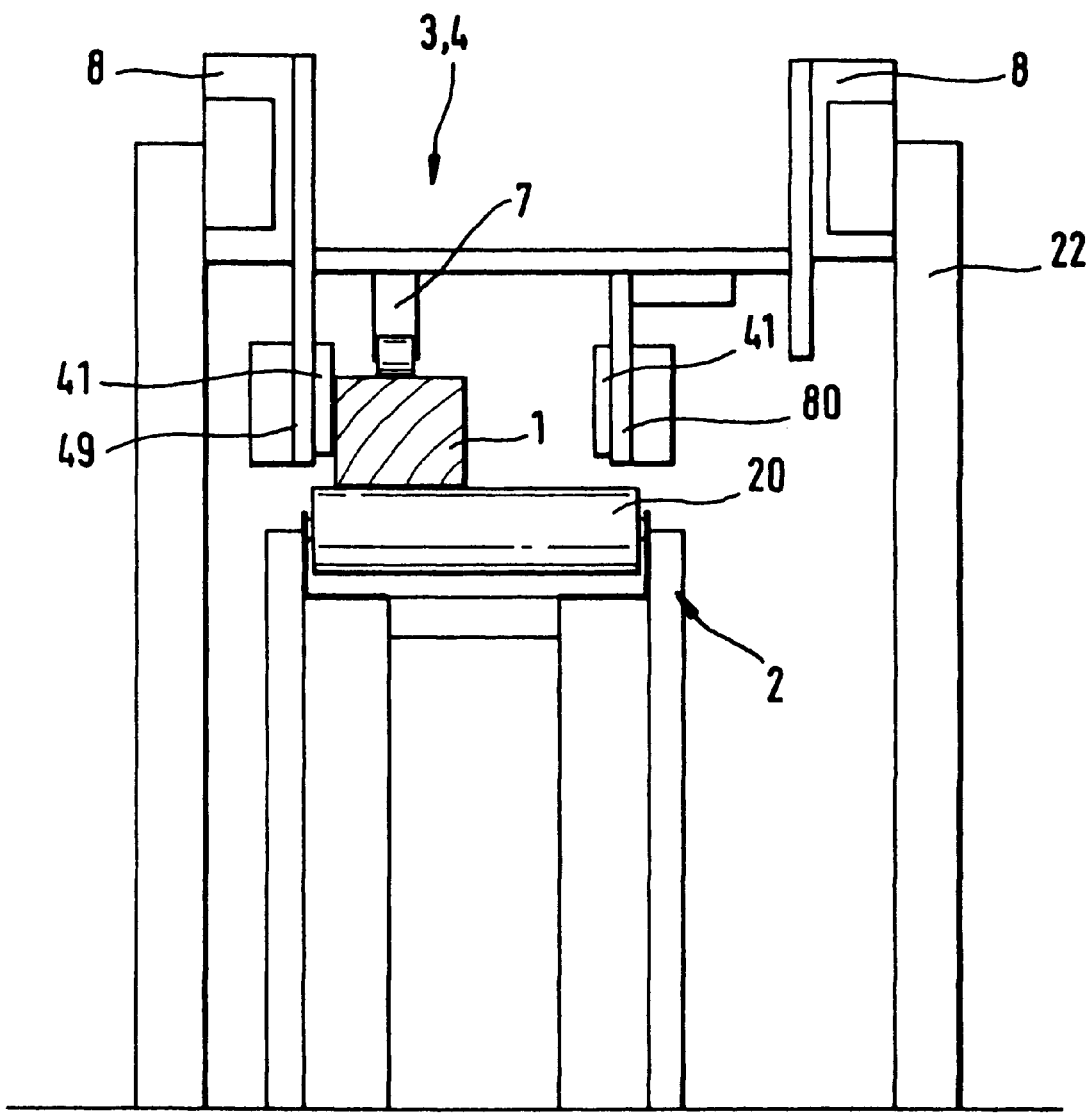

In FIG. 3 there is shown a further embodiment of the woodworking machine. In this example there is provided a portal-like guiding and coupling element 3, 4 which is guided by a portal guideway 8, designed as a double guideway 80. The portal guideway 8 is carried by the portal frame 22. The portal guideway 8 and the portal frame 22 are arranged on the left and right, as seen in the conveying direction, of the support 2 and thus increase the stability of the arrangement of guiding element and coupling element. In the exemplary embodiment shown, the left clamping jaw 49, against which the workpiece 1 rests, is of stationary design, with the result that this clamping jaw 49 also acts at the same time as a stop. The other clamping jaw 80 is movable transversely to the conveying direction 10 and can be placed against the workpiece 1, in a similar way to that in FIG. 2.

Besides the arrangements of the guideway 8, 6 shown respectively in FIGS. 2 and 3, it is also possible to arrange the guideway, for example, below the workpiece 1 or laterally below the workpiece 1.

In FIG. 2 the guideway 6 is arranged laterally beside the workpiece 1, the clamping carriage, which serves as a coupling element or guiding element (3, 4), being supported on one side. For this purpose, the guideway 6 is equipped with double bearing surfaces in order to provide a secure support for the clamping carriages.

The portal guideway 8 may be constructed in the same way likewise with double bearing surfaces, in order to ensure a high degree of stability and accuracy.

Figure 4:
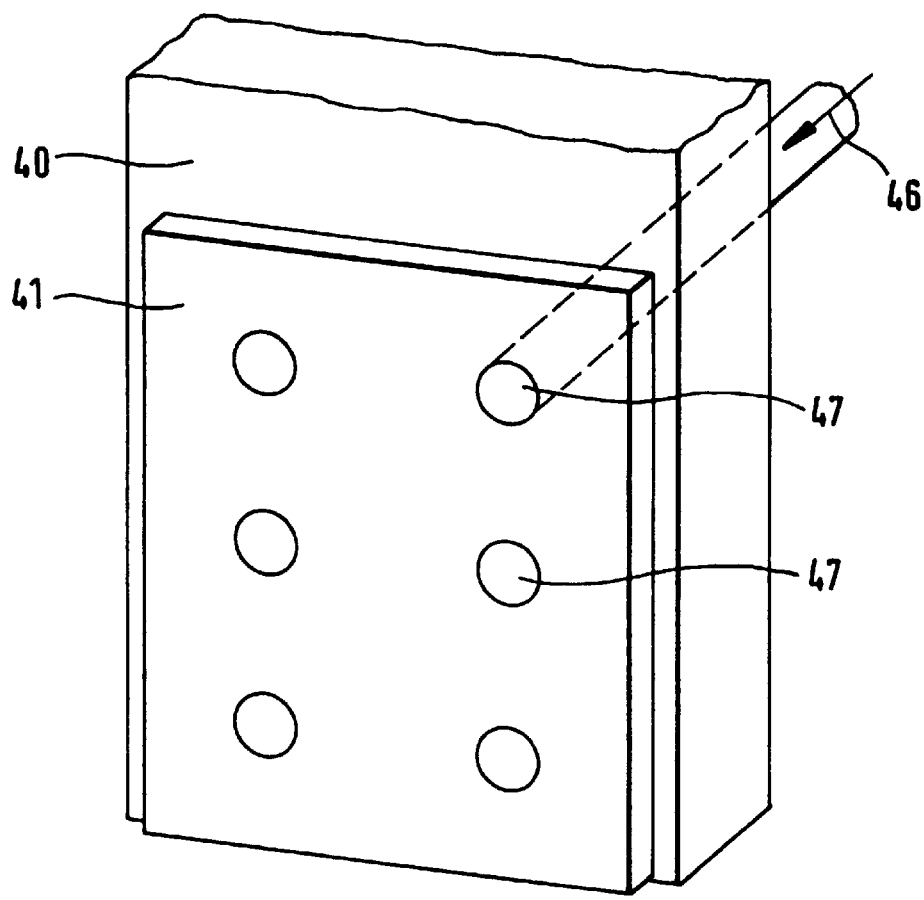

In FIG. 4 there is shown in an enlarged representation a detail of the clamping jaw 40. The clamping jaw 40, which is, for example, of longitudinally movable or stationary design, possesses a sliding plate 41. This sliding plate 41 is formed from plastic, for example from TEFLON non-stick coating, polyamide, polyethylene, PVC or the like. The sliding plate is designed so that it has as low a coefficient of friction as possible in order, when the clamping jaw is employed as a guiding element, to enable smooth running of the workpiece 1 held or guided by the guiding element 4. As described, the function of the guiding element may also be switched over into a function as a coupling element. For this purpose, either the pressure of the clamping jaw 40 as a whole on the workpiece is increased, for example by an increased force with which it is placed against the workpiece, or else rams 47, embedded in the clamping jaw 40, are placed against the workpiece 1 by a force means 46. It is favourable for the head of the clamping ram 47 to be furnished with rubber or another material with a high coefficient of friction. It is proposed to finish the sliding face 41 with a material with a low coefficient of friction, in order to provide as low a friction as possible at the guiding element. In the case, however, where the clamping carriage is used as a coupling element 3, the clamping rams 47 are deployed, with the result that, through an appropriate design of the heads, optimal coupling is possible. Besides an appropriate material with a high coefficient of friction, it is, however, also possible to provide points, needles, cutting edges or other elements which establish a positive connection. The resulting positive connection ensures reliable coupling between the coupling element and the workpiece.

Furthermore, there is provision for the head of the clamping ram 47 to be set back, in the passive position, with respect to the contact surface of the clamping jaw 40. In the passive position, i.e. in the position in which the clamping rams 40 are not deployed (for example when the clamping carriage is used as a guiding element), this position ensures that the head, which is, for example, coated or equipped with elements forming a positive connection, is not in contact with the workpiece 1. However, this constructional embodiment may also be used to strip the clamping ram 47 reliably from the workpiece 1 when changing the clamping carriage from a coupling element 3 to a guiding element 4. In this case, the sliding plate 41, which then rests against the workpiece 1, acts as a stripping bearing and abutment. This may be advantageous particularly in cases where elements are provided on the head of the clamping ram 47 which form a positive connection, i.e. actually dig into the workpiece 1. Reliable detachment of the coupling element from the workpiece 1 is achieved through this embodiment.

Figure 5:
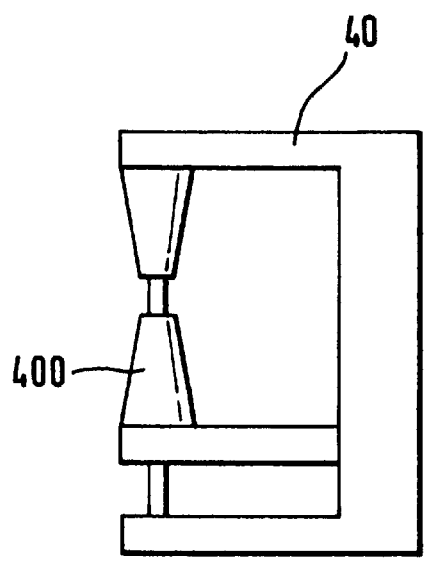

In FIG. 5 there is shown a further embodiment of a clamping jaw 40. In an example illustrated here, there is provided on the clamping jaw 40 a rotatable body 400 which is designed as a double truncated cone in the exemplary embodiment shown here. This double truncated cone has the effect that even round cross-sections, for example complete boles, are moved and guided by the coupling element and the guiding element and thus can also be processed in the woodworking machine.

Besides the use of a truncated cone or double truncated cone, the truncated cones being oriented in such a way as to be turned in opposite directions in relation to one another, it is, however, also possible to employ a cylinder (for example a roller) or the like as the body 400. Through appropriate dimensioning of the double truncated cone, the clamping jaw may also be adapted without any problems to the appropriate round cross-sections. There is also provision for the distance between the two truncated cones and in the case of a double truncated cone to be variable in order to adapt to the various radii of the timbers.

There is provision for the body 400 to be of brakable design in order, through a coupling or brake, to change between the function of a guiding element and coupling element. Conversely, it is also possible to equip the body 400 with a drive in order to perform, in the case of a clamping carriage, a relative movement of the workpiece with respect to the clamping carriage, if required.

Figure 6:
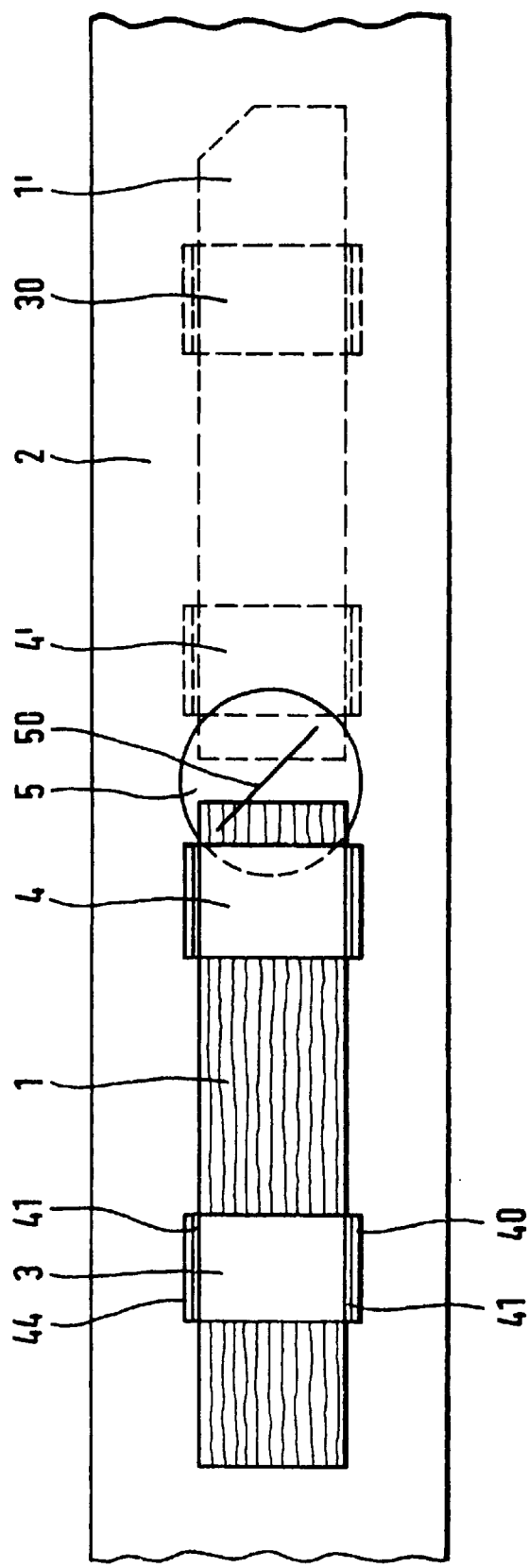
FIG. 6 shows in plan view a special embodiment of the woodworking machine according to the invention.

In FIG. 6 there is shown an advantageous application in particular of the guiding element 4, 4'. The workpiece 1 is transported in from the left. In this exemplary embodiment, the guiding element 4 is preferably situated substantially the whole time in the immediate vicinity of the working unit 5, which is designed, for example, as a saw 50. A first coupling element 3 conveys the workpiece 1 towards the saw 50 in order, for example, to make a cut or moulding. When the working operation is finished, the workpiece 1 is conveyed to the right into the position 1' and transferred to a second coupling element 30. If the rear-side end of the workpiece 1 is now worked, the guiding element 4', which has previously guided the front end relative to the working unit, is used again. Meanwhile, the first coupling element 3 is free and is able to advance a new workpiece 1. A marked increase in efficiency is thereby achieved.

Figure 7:
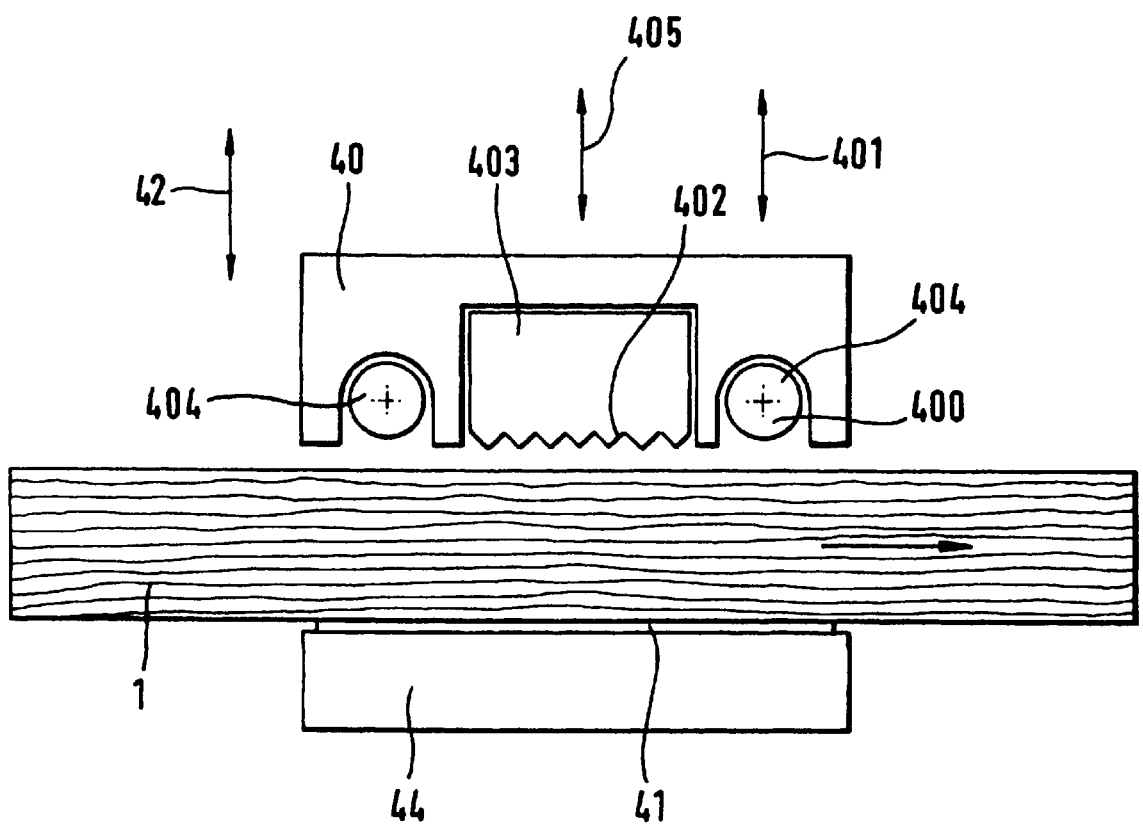
FIG. 7 shows in plan view a diagrammatic representation of a clamping jaw of the woodworking machine according to the invention.

In FIGS. 7, 8 and 9 there are shown advantageous embodiments in particular of a sliding body (404) and clamping body (403). FIG. 7 shows a diagrammatic general view. The chosen arrangements do not correspond to the realistic scale. The clamping carriage illustrated comprises, diagrammatically, two clamping jaws 40, 44, the stationary clamping jaw being denoted by 44. The latter has a sliding plate 41 on its inner face, turned towards the workpiece 1. With the aid of a working cylinder (not illustrated specifically), the movable clamping jaw 40 can be placed against the wood (see arrow 42) and also retracted.

A change in the functionality of a clamping carriage thus equipped, between coupling element and guiding element, is realized in the embodiment illustrated here by the provision of a clamping body 403 and a sliding body 404. A rotatably mounted body 400 is possible here as the sliding body 404. A toothed, grooved or cutting-edge plate, equipped with teeth 402, is provided here, for example, as the clamping body 403. The clamping body 403 is generally designed to have as high a coefficient of friction as possible in order to enable a good frictional or positive connection of the clamping carriage as the coupling element 3 with the workpiece 1. Various means, such as a rubber plate, spiked or piercing plate, needle plate, screw plate etc., are known from the prior art.

The possibility of switching between the coupling element 3 and guiding element 4 functionality is now achieved by the smooth-running sliding body 404 being placed against the workpiece 1 (this is indicated by the double arrow 401), with the result that the relative movement of the workpiece 1 with respect to the guiding element 4 is then possible. The workpiece 1 then rolls smoothly on the rollers and the sliding plate 41. If the functionality is to be switched to a coupling element 3, the clamping body 403 is brought into engagement with the workpiece 1 instead of the sliding body 404. For this purpose, it is possible first to retract the sliding body 404 according to arrow 401 in the region in which it acts on the workpiece 1 and then to place the clamping body 403 against the workpiece 1 by appropriate actuation along the double arrow 405. Besides this dual mobility, i.e. the mobility of the clamping body 403 and of the sliding body 404, it is also possible for only one of these two elements to be of movable design in order to bring one or other body into engagement with the workpiece 1.

In FIGS. 8, 9 these different clamping or coupling and guiding functionalities are illustrated using the diagrammatically illustrated clamping carriage. In FIG. 8 first of all the clamping body 403 can be seen protruding inwards, while the sliding body 404 is set back somewhat. In FIG. 9 it is precisely the other way round, namely the sliding body 404 protrudes inwards, turned towards the workpiece 1 which is not illustrated, with respect to the clamping body 403. This is brought about by an appropriately arranged working cylinder (pneumatic, hydraulic) or an electrically driven actuating mechanism.

For the clamping movement, which likewise serves, where appropriate, additionally or perhaps only exclusively for differentiating between the coupling element 3 and guiding element 4 functionality of a corresponding clamping carriage, there is provided here a force means which is equipped as a pneumatic cylinder 406 and ultimately enables movement of the movable clamping jaw 40 along the double arrow 42.

Although the invention has been described in terms of specific embodiments which are set forth in considerable detail, it should be understood that this is by way of illustration only and that the invention is not necessarily limited thereto, since alternative embodiments and operating techniques will become apparent to those skilled in the art in view of the disclosure. Accordingly, modifications are contemplated which can be made without departing from the spirit of the described invention.

What is claimed is:

1. Woodworking machine for working elongated workpieces, said machine comprising
   a) a support for supporting a workpiece,
   b) at least one working unit,
   c) a longitudinally movable coupling element for guiding, in use, the workpiece to said at least one working unit,
   d) a clamping carriage, and
   e) at least one movable clamping jaw provided on said clamping carriage, said clamping carriage serving as a coupling element and said coupling element clamps the workpiece with said at least one movable clamping jaw for guided movement of the workpiece to said at least one working unit.

2. Woodworking machine according to claim 1, wherein a guiding element is longitudinally movable and positionable in such a manner at said at least one working unit so that optimal workpiece guidance is achieved and said coupling element and said guiding element remain outside an operative region of said at least one working unit.

3. Woodworking machine for working elongated workpieces, said machine comprising
   a) at least one working unit,
   b) a longitudinally movable coupling element for guiding, in use, a workpiece to said at least one working unit, and
   c) a guiding element longitudinally movable and positionable in such a manner at said at least one working unit so that optimal workpiece guidance is achieved and said coupling element and said guiding element remain outside an operative region of the working unit.

4. Woodworking machine according to claim 3, wherein the workpiece rests on a table with one of a sliding surface and a roller track.

5. Woodworking machine according to claim 3, wherein the workpiece rests in the coupling element and the guiding element.

6. Woodworking machine according to claim 3, wherein an engagement surface is placed against the workpiece and establishes a frictional/positive connection with the workpiece as the coupling element.

7. Woodworking machine according to claim 3, wherein a clamping carriage equipped with at least one movable clamping jaw serves as the coupling element and the coupling element clamps the workpiece with the at least one movable clamping jaw.

8. Woodworking machine according to claim 3, wherein said guiding element is positioned dynamically in such a manner that the guiding element positions the workpiece as close as possible to the working unit in dependence on a location/position of the working unit.

9. Woodworking machine according to claim 3, wherein the guiding element also serves as a coupling element and conveys the workpiece.

10. Woodworking machine according to claim 3, wherein the guiding element firmly clamps the workpiece at a working unit.

11. Woodworking machine according to claim 3, wherein the coupling element and the guiding element are movable on a rail in a slidelike-displaceable, separately controllable manner and the workpiece is conveyed along said rail through the at least one working unit.

12. Woodworking machine according to claim 3, further comprising a coupling and guiding element.

13. Woodworking machine according to claim 3, wherein a working tool is, at least temporarily, fixedly assigned a guiding element and two or more workpieces are worked simultaneously and for each workpiece at least one coupling element is provided.

14. Woodworking machine according to claim 3, wherein the workpiece is gripped by the coupling element substantially in a central region and the guiding element engages on an end region and also functions as a coupling element.

15. Woodworking machine according to claim 3, wherein the coupling element grips and conveys the workpiece at a short distance behind the guiding element and the coupling element re-grasps the workpiece in order to convey on the workpiece.

16. Woodworking machine according to claim 3, wherein a clamping carriage includes at least one movable clamping jaw and moves the workpiece against the at least one movable jaw in a manner of a stop and serves as the guiding element.

17. Woodworking machine according to claim 16, wherein the at least one movable clamping jaw has a vertical, horizontal and oblique clamping direction.

18. Woodworking machine according to claim 16, wherein a drive for a relative movement of the workpiece with respect to the clamping carriage is provided on the clamping carriage.

19. Woodworking machine according to claim 16, wherein one or more working tools are provided on the clamping carriage.

20. Woodworking machine according to claim 16, wherein a turning or pivoting device for the workpiece is provided on the clamping carriage.

21. Woodworking machine according to claim 3, wherein the workpiece is worked by a working tool during one of pivoting and in a pivoted position.

22. Woodworking machine according to claim 1, wherein said at least one movable clamping jaw has a body made of plastic on an inner side turned towards the workpiece.

23. Woodworking machine according to claim 1, wherein said at least one movable clamping jaw has a clamping body for positive connection with the workpiece.

24. Woodworking machine according to claim 1, wherein said at least one movable clamping jaw is movable by a pneumatic cylinder towards the workpiece to firmly clamp the workpiece.

25. Woodworking machine according to claim 1, further comprising a stationary clamping jaw as a longitudinally movable stop for defining a zero line.

26. Woodworking machine according to claim 3, further comprising a pair of movable clamping jaws drivable by a gearing by a common drive.

27. Woodworking machine according to claim 26, wherein a center plane between the two movable clamping jaws is defined by a zero line.

28. Woodworking machine according to claim 26, wherein both of said pair of movable clamping jaws are placed against the workpiece.

29. Woodworking machine according to claim 26, wherein one of said pair of movable clamping has both a sliding body and a clamping body, movable relative to one another, and placed against the workpiece having a function of one of a coupling and guiding element, determined according to a choice of the body placed against the workpiece.

30. Woodworking machine according to claim 26, wherein a force impressed on the workpiece by the clamping jaw is greater during gripping and transporting of the workpiece than a force impressed when the guiding element guides the workpiece in a region of a working unit.

31. Woodworking machine according to claim 1, wherein the at least one movable clamping jaw carries rotatable and brakable bodies as one of a sliding and a clamping body.

32. Woodworking machine according to claim 31, wherein the sliding body and the clamping body are one of a sphere, cylinder, truncated cone and double truncated cone.

33. Woodworking machine according to claim 3, wherein a hold-down roller for the workpiece is provided on the coupling element and the guiding element.

34. Woodworking machine according to claim 33, wherein the hold-down roller is displaceable in a transverse direction in relation to a longitudinal conveying direction of the workpiece.

35. Woodworking machine according to claim 3, wherein the guiding element is guided on a guideway and is movable by the guideway towards the workpiece and is lowerable from above towards the workpiece.

36. Woodworking machine according to claim 3, wherein the coupling element and the guiding element reach in the manner of a portal over/under the workpiece and a double guideway is provided for the guidance of the coupling element and the guiding element.

37. Woodworking machine according to claim 33, wherein the hold-down roller is moved towards and placed against the workpiece independently of movement of the coupling element and the guiding element.

38. Woodworking machine according to claim 3, further comprising one of an NC and a CNC control system, and each coupling element and guiding element is individually controllable.

39. Woodworking machine according to claim 38, wherein the control system sets a position of the guiding element at the workpiece and a holding force at a clamping jaw on a respective guiding element in dependence on the working unit.

40. Woodworking machine according to claim 38, wherein the control system specifies, in dependence on a working step, that the workpiece is moved by at least one coupling element, while the guiding element guides the workpiece.

41. Woodworking machine according to claim 3, wherein a moving workpiece is transferred from a first coupling element to a second coupling element.

42. Woodworking machine according to claim 3, wherein two coupling/guiding elements grip the workpiece, each guiding element gripping the workpiece in an end region.

43. Woodworking machine according to claim 3, wherein one or more guideways for the clamping carriages are provided parallel to one another and one or more clamping carriages are employed, substantially independently of one another, as one of the coupling element and the guiding element on one or more guideways.

44. Woodworking machine according to claim 3, wherein the workpiece is guided by the guiding element, the workpiece moving relative to the guiding element.

* * * * *